(Model.)
A. E. RICH.
BOTTLE STOPPER AND FASTENER.
No. 252,059. Patented Jan. 10, 1882.
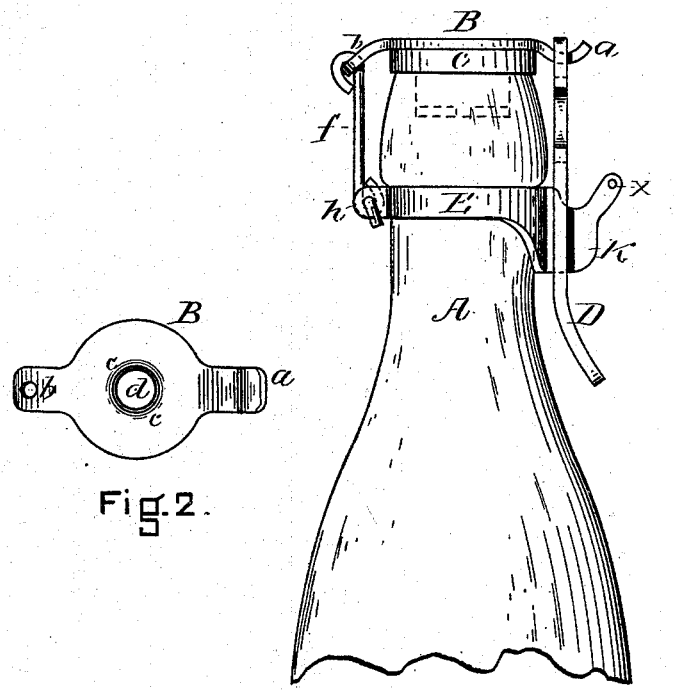
Fig. 1.
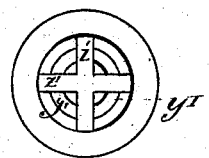
Fig. 3.
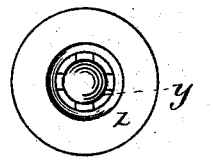
Fig. 4.
Fig. 2.
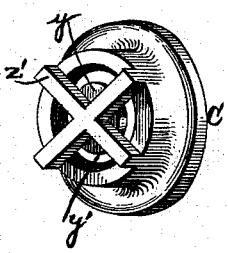
Fig. 6.
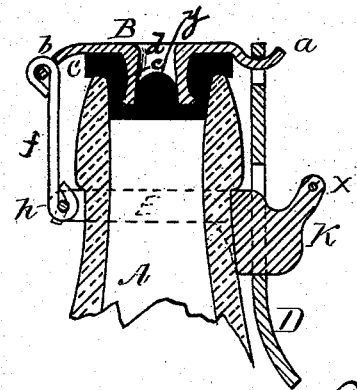
Fig. 5.
WITNESSES
W. C. Fogg.
E. A. Phalen.
INVENTOR
Augustus E. Rich
by his atty
F. F. Raymond 2d

UNITED STATES PATENT OFFICE.

AUGUSTUS E. RICH, OF FALL RIVER, MASSACHUSETTS.

BOTTLE-STOPPER AND FASTENER.

SPECIFICATION forming part of Letters Patent No. 252,059, dated January 10, 1882.

Application filed August 19, 1881. (Model.)

*To all whom it may concern:*

Be it known that I, AUGUSTUS E. RICH, of Fall River, in the county of Bristol and State of Massachusetts, have invented a new and useful Improvement in Bottle-Stoppers and Bottle-Stopper Fasteners, which improvement is fully set forth in the following specification and accompanying drawings, in which—

Figure 1 is a side elevation of the stopper and fastener as applied to a bottle. Fig. 2 is the top side of the metal part of the stopper. Fig. 3 is the rubber valve. Fig. 4 is the rubber part of the stopper holding the valve and teat. Fig. 5 is a vertical section of the complete device. Fig. 6 is a perspective view, looking diagonally at the bottom of the rubber part of the stopper.

Like letters denote corresponding parts.

My invention has more particular reference to a bottle-stopper and fastener to be used in bottling aerated drinks or liquids, such as the different sodas, tonic beer, ginger-ale, or any other liquids where gas is used in connection with its manufacture, but may be used for any liquids.

The principal parts of my combination are a metal cap-piece, a rubber stopper or packing with valve, a neck-band and fastening device for holding the stopper part in the mouth of the bottle. The metal cap-piece B is shown in Fig. 2. $d$ is a hole through the center. There is a projection, $c$, (see Fig. 5,) upon the under side of the cap-piece, upon which the the rubber stopper or packing is sprung. $a$ is a lug or ear projecting upward when upon the bottle, as shown in Fig. 1. $b$ is another lug or ear projecting downward, as shown in Fig. 1. The hole $d$ in the projection $c$ of the cap-piece is made tapering. The rubber stopper or packing shown in Fig. 4 has a hole in its center, and is sprung over the projection heretofore mentioned. The round nipple $y$ of rubber is made to fit into the hole of the projection of the metal cap-piece, when the rubber is sprung on the metal cap-piece around projection $c$.

Fig. 3 represents the under side of the rubber stopper, having one or more rubber bars, $z'$, across the bottom. On the center of the cross-bar or cross-bars rests the upwardly-rounded teat $y$. Between the bars, or on each side if only one bar is used, are holes formed in molding the rubber, (represented by $y'$, Fig. 3.) These holes allow the gas and liquid to enter the bottle through the stopper. The cross-bars hold up the teat into the hole in the projection to the cap-piece by the elasticity of the rubber. Thus the joint or valve is not dependent upon the force of the gas in the bottle to hold it in place and to form a tight joint.

The rubber stopper or packing is made with a flange next to the cap-piece, and securely fits over the mouth of the bottle, and the whole, including the teat and cross-bars, is cast or molded of rubber, and is all of one piece. The rubber stopper being sprung onto the projection of the metal cap-piece, the complete stopper is held and drawn to place by the following fastening mechanism: The ear $b$ of the metal cap-piece has a hole through it, by which it is fastened to the neck-band by a link or similar connection, (marked $f$.) The neck-band is preferably made of metal, and is fastened at its ends around the neck of the bottle by a screw or rivet at its ends $h$. Opposite the ends of the neck-band, which are screwed or riveted together, is a projection or latch (marked $k$, Fig. 1.) At the upper end of this latch or projection or horn is a small rivet or point, inserted to prevent the lever D, which is slotted on the latch or horn, from sliding off. This rivet is shown at $x$, Fig. 1.

The under side of the latch or horn is made to round upwardly as it goes from the bottle toward the point of the same, and it is thus made so that as the slotted lever is pressed toward the bottle, sliding upon the latch, the lever will exert its utmost tension upon the stopper without passing its center of gravity. I preferably make the part of the latch upon which the lever presses when at rest—that is, nearest the bottle—either flat or slightly depressed. If the under side of the latch is made as described, the locking-lever will always remain in position without being loosened and without any artificial assistance to hold it in position. This I regard as an important part of my invention.

The slotted lever, fitting the latch projecting out at right angle from the neck-band, and being attached to the band, also engages or hooks on the ear or lug $a$, Fig. 1. The stopper being placed over the mouth of the bottle, the slotted lever is hooked or engaged on the ear or lug $a$ by pressing the lever downward and inward toward the neck of the bottle. The stopper is drawn down securely to its place and firmly held, the lever in its slotted part engaging the latch or horn, as shown in Fig. 1. The cap-piece B is hinged or linked by its ear *b* to neck-band, and is drawn down upon the mouth of the bottle by the closing mechanism engaging the opposite ear *a*. By this arrangement the surface of the cap-piece may be left clear and a better joint formed when the bottle is being filled.

Having given a description of my invention, I will now give a description of the manner of using the same.

The filling is usually done by the aid of a bottling-machine. The stopper is first placed in position over the mouth of the bottle, as previously described. The bottle is then placed under the tube in the bottling-machine, similarly as done when bottling with a cork, and is pressed up firmly against the packing at the bottom of the tube of the bottling-machine. The top of the tube is stopped by pushing a cork or other suitable stopper into it to prevent the gas from escaping that way. The lever on the fastening device is left loose, being hooked over the ear *a*. The gas and liquid are now turned on in the usual manner, as when bottling with a cork. When the pressure in the bottle becomes equal to that in the gas generator or holder by the air being compressed in the bottle, the air is allowed to escape around the stopper or between the stopper and the bottle. By slightly lessening the pressure against the mechanism of the bottling-machine the stopper, not being drawn down upon its seat by the lever and fastening device, is lifted by the pressure within the bottle sufficiently to allow the air to escape, while at the same time the stopper is prevented from coming out or of being removed from its position over the mouth of the bottle by the slotted lever, which during this time engages the ear *a*. This is done one or more times in filling each bottle. When the bottle becomes full the lever D is pressed downwardly and inwardly, sliding on the latch or lug or horn *k* and drawing firmly down the stopper and retaining it in the position shown in Fig. 1. The stopper is drawn down into place before removing the bottle from the packing at the bottom of the tube of bottling-machine.

I am aware that the hole or induct through the cap-piece or through the stopper is not new; also, that a valve has been used to close the hole in stopper; but all forms of valves or plugs heretofore used are kept in position by the pressure of the gas in the bottle. My valve is not dependent upon the force of the gas within the bottle, but the teat fitting the hole in the projection to the cap-piece, being self-supporting, is always in position and effective.

I am aware that stoppers have been connected or fastened to the neck-band by means of a hasp, used similarly to the common form of hasp and staple, said hasp being attached permanently to the stopper. I therefore do not claim this construction.

What I claim as new, and desire to secure by Letters Patent, is—

1. A bottle-stopper-fastening device consisting of a neck-band with an outwardly and upwardly projecting latch, in combination with a slotted lever arranged to engage detachably with the ear of a stopper-cap, said cap being linked to the neck-band, and the lever operating with a downward and inward motion, sliding upon said latch, but not detachable therefrom, all arranged substantially as and for the purposes set forth.

2. The metal cap-piece with ears *a* and *b*, one ear being linked to the neck-band of a bottle, in combination with a flexible valve-stopper having an elastic teat, substantially as and for the purposes set forth.

3. In combination, a flexible stopper with upwardly-projecting and self-supporting teat formed in one piece with cap-piece, having induct through its center, a means for connecting the cap-piece to the bottle-neck, and a neck-band having an outwardly and upwardly projecting latch or horn, with slotted lever arranged to detachably connect with cap-piece and said latch or horn, all substantially as and for the purposes set forth.

4. In combination with the flexible stopper and cap-piece, the link *f*, neck-band *e*, latch or horn *k*, and slotted lever D, having means for detachably engaging the cap-piece, substantially as and for the purposes set forth.

5. A stopper linked to a neck-band of a bottle, in combination with a detachable slotted lever operating on an upwardly and outwardly projecting latch or horn, the horn being attached to the neck-band, all arranged substantially as and for the purposes set forth.

6. A neck-band having an upwardly and outwardly projecting latch or horn, in combination with a slotted lever, arranged to detachably engage or hook to the stopper and slide upon the horn, substantially as and for the purposes set forth.

7. The metal cap-piece B, in combination with the flexible valve-stopper having an elastic teat supported by cross-bars, arranged as and for the purposes set forth.

8. A flexible stopper consisting of a rim to fit the mouth of a bottle and an upwardly-projecting teat supported by bars across the bottom, all molded or formed in one piece, substantially as described.

9. In a flexible stopper, a valve consisting of an upwardly-projecting elastic teat supported by cross-bars, said teat made to fit the hole in the downwardly-projecting metal top, all arranged substantially as described.

10. The combination of a flexible stopper having an elastic valve and a supported elastic teat with a metal cap-piece having an aperture, substantially as and for the purposes set forth.

Witnesses:     AUGUSTUS E. RICH.
  BOWDOIN S. PARKER,
  GEO. W. SPEERS.